Oct. 13, 1936.  M. H. LEMELL  2,057,102
ROLLER BEARING
Filed Feb. 10, 1934
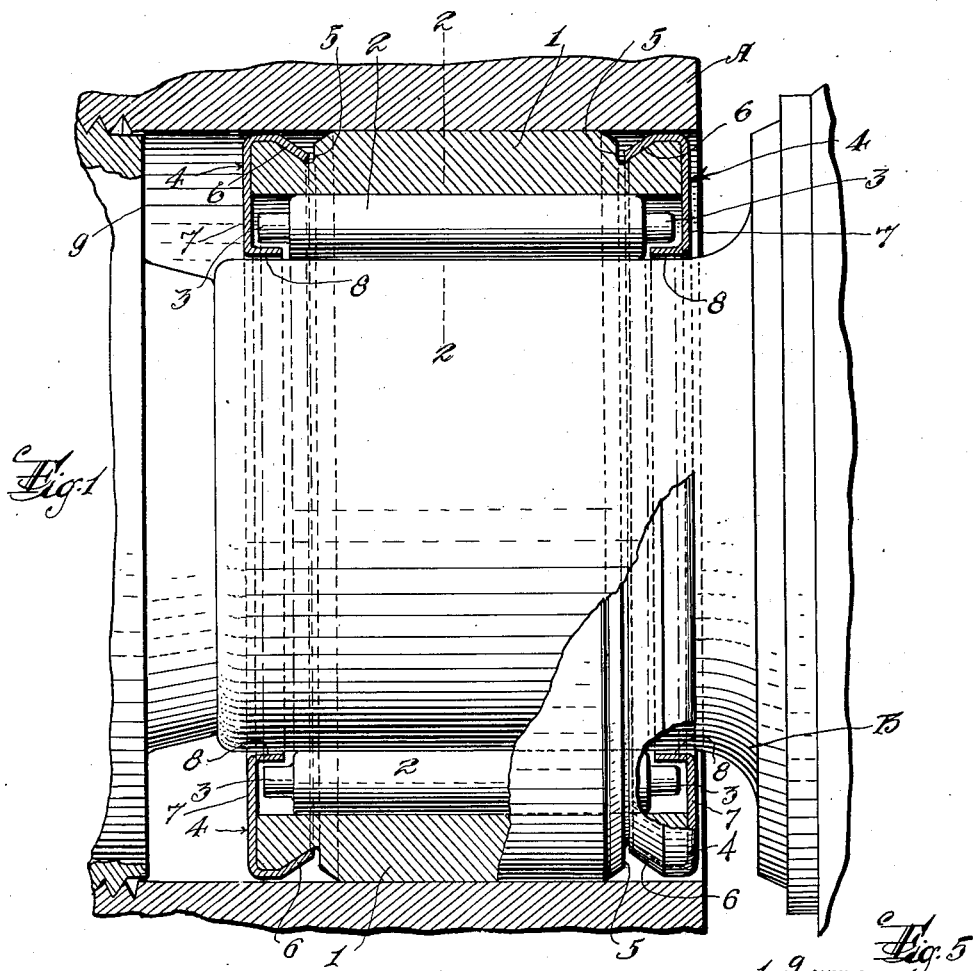
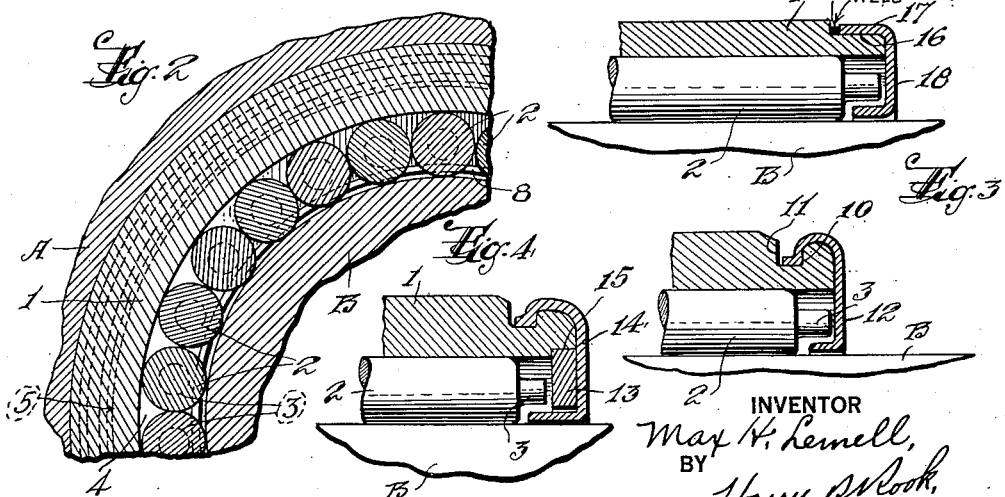
INVENTOR
Max H. Lemell,
BY
Harry N. Cook,
ATTORNEY Patented Oct. 13, 1936

2,057,102

UNITED STATES PATENT OFFICE 2,057,102

ROLLER BEARING

Max H. Lemell, Trenton, N. J., assignor to Roller Bearing Company of America, Trenton, N. J., a corporation of New Jersey Application February 10, 1934, Serial No. 710,683

3 Claims. (Cl. 308—212)

This invention relates in general to roller bearings, and more particularly the invention contemplates a roller bearing that shall include a maximum number of rollers possible in a bearing of given diameter and mounted in a race in close relation to each other so as to be freely movable circumferentially of and relatively to the race, whereby the bearing shall have great load capacity and the bearing can be used in journals or with rotating members which afford such a small space for rollers as to make use of known types of roller bearings practically impossible.

Another object is to provide a roller bearing of this character embodying novel and improved features of construction and combination of a race and a roller retainer, whereby the bearings shall be inexpensive in structure and the parts can be easily and quickly assembled at low cost.

Other objects are to provide such a roller bearing which shall include a novel and improved race and a novel and improved roller retainer, whereby said race and retainer can be combined or assembled to completely control the length of the space for the rollers in the race; to provide a roller bearing of this character embodying novel and improved inexpensive means for connecting a roller retainer to a race; to provide a roller bearing of the character described formed of relatively soft and inexpensive metal and having a hardened thrust bearing washer in the roller retainers to resist wear of the retainers by the rollers under heavy loads or high speeds where there is a tendency for the ends of the rollers to wear through the retainers; and to obtain other advantages and results as will be brought out by the following description.

Referring to the accompanying drawing in which corresponding and like parts are designated throughout the several views by the same reference characters, Figure 1 is an enlarged vertical longitudinal sectional view through a roller bearing embodying my invention, showing the bearing mounted in a journal for a shaft.

Figure 2 is a fragmentary transverse vertical sectional view on the line 2—2 of Figure 1.

Figure 3 is a fragmentary vertical longitudinal sectional view through one end of a modified form of bearing.

Figures 4 and 5 are similar views showing different forms of the invention.

Specifically describing the invention illustrated in Figures 1 and 2, the reference character A designates a journal or bearing box for a stub shaft or trunnion B of known construction. Arranged within the bearing box and between it and the shaft B is a roller bearing constructed in accordance with my invention. This roller bearing comprises a hollow cylindrical race 1 which has a plurality of rollers 2 therein and movable circumferentially thereof in closely contacting relation to each other. As usual, these rollers are disposed between the race 1 and the shaft B.

My invention is especially directed to the holding or retaining of the rollers in the race and as shown, each of the rollers have reduced ends 3, that is, end portions of a diameter less than the main portions of the rollers. A retainer ring 4 is secured on each end of the race to provide a channel between itself and the inner surface of the race in which are arranged the corresponding ends of the ends 3 of the rollers 2. Specifically, each end of the race has an exterior circumferential groove 5 and the retainer ring has a flange 6 turned into the groove so as to hold the retainer ring on the race. The retainer ring also has a portion 7 which constitutes the base of the channel and which is disposed in abutting relation to the ends of the rollers, and another flange 8 which receives reduced ends of the rollers between itself and the inner surface of the race. The ends of the rollers are loosely disposed with respect to the retainer rings so that the rollers may freely move circumferentially of the race, but the retainer rings prevent both longitudinal and lateral movement of the rollers out of the race. In other words, the retainer rings hold the rollers together and within the race so that the race, the rollers and the retainers can be handled as a unit without danger of displacement of the rollers therefrom.

A modification of the invention is shown in Figure 3 which is in general similar to that shown in Figure 1. In the construction shown in Figure 1 the outer wall 9 of the groove 5 is inclined which makes easy the attachment of the flange 6 of the retainer ring to the race. In the form shown in Figure 3 the outer wall 10 of the groove 11 is approximately perpendicular to the axis of the race which provides a more secure attachment of the retainer ring 12 to the race but makes the attachment of the retainer ring somewhat more difficult.

Figure 4 shows a further modification of the bearing wherein a thrust bearing washer 13 is disposed between the ends 3 of the rollers and the retainer ring 14. This washer may be mounted in a rabbet 15 at the end of the inner wall of the race and is provided to resist wear on the retainer ring incident to longitudinal thrust of the rollers under heavy loads or high speed. The retainer rings are generally made of soft metal in the interest of low cost of manufacture and the ease of attachment of the ring to the race, and without a hardened thrust bearing like the washer 13, the ends of the rollers might wear through the retainer rings.

In Figure 5 the end of the race is provided with a rabbet 16 on its outer periphery, and the flange 17 of the retainer ring 18 is nicely fitted into said rabbet and welded at 19 to securely attach the retainer ring to the race.

It should be understood that I contemplate the use of any one form or embodiment of the invention illustrated in the drawing at one end of the race, and any other suitable roller retaining means at the other end of the race; it not being necessary that the same form of roller retainer be used at both ends of the bearing.

Where desired the rollers can be made of extremely small diameter and arranged in close relation to each other the roller retaining means serving to hold the rollers circumferentially of the race as a unit, so that the bearing can be used under heavy loads under high speeds and in place where ordinary roller bearings cannot be utilized. Moreover, the bearing is simple and inexpensive.

While I have shown and described several preferred embodiments of my invention it should be understood that this is primarily for the purpose of illustrating the principles of the invention and that many modifications and changes may be made in the details of construction of the bearing without departing from the spirit or scope of the invention.

Having thus described my invention, what I claim is:

1. A roller bearing comprising a hollow cylindrical race and a plurality of rollers therein movable circumferentially thereof and having reduced ends, said race having a circumferential recess at one end, a sheet metal roller retainer having a portion fastened in said recess to attach the retainer to the race and another portion receiving the corresponding ends of the rollers to hold the rollers in the race, a hardened thrust bearing ring mounted between the second-mentioned portion of said retainer and the ends of said rollers, and retaining means for said rollers at the other end of said race.

2. The roller bearing set forth in claim 1 wherein the end of said race to which said roller retainer is connected has an interior rabbet and said thrust bearing ring is seated in said rabbet.

3. A roller bearing comprising a hollow cylindrical race, a plurality of rollers therein movable circumferentially thereof, one end of said race having an exterior circumferential groove, a sheet metal retainer ring for said rollers approximately channel-shaped in cross-section having one flange secured in said groove, its base in abutting relation to the corresponding ends of said rollers and its other flange receiving said ends of the rollers between itself and the inner surface of said race, and a hardened thrust bearing member mounted between said retainer and said ends of the rollers to resist wear incident to endwise thrust of said rollers.

MAX H. LEMELL.